(12) United States Patent
Takaji et al.

(10) Patent No.: US 7,436,140 B2
(45) Date of Patent: Oct. 14, 2008

(54) IMAGE DISPLAY DEVICE AND STAND FOR IMAGE DISPLAY DEVICE

(75) Inventors: Masanori Takaji, Fujisawa (JP); Tatsuya Nakazawa, Kamakura (JP); Yutaka Yamada, Yokohama (JP); Toshihiko Matsuzawa, Kamakura (JP); Satoshi Ishizuka, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 165 days.

(21) Appl. No.: 11/455,639

(22) Filed: Jun. 20, 2006

(65) Prior Publication Data

US 2006/0284034 A1    Dec. 21, 2006

(30) Foreign Application Priority Data

Jun. 20, 2005    (JP) .............................. 2005-178713

(51) Int. Cl.
*H02P 1/04*    (2006.01)
*G05B 23/02*    (2006.01)

(52) U.S. Cl. ................. 318/466; 318/567; 318/640; 248/349.1; 348/836

(58) Field of Classification Search ............... 318/466, 318/563, 640; 348/836, 838; 345/728
See application file for complete search history.

(56) References Cited

U.S. PATENT DOCUMENTS

| | | | | | |
|---|---|---|---|---|---|
| 2,565,079 | A | * | 8/1951 | Kern ........................... 434/365 |
| 4,123,782 | A | * | 10/1978 | Kitahara et al. .......... 348/211.6 |
| 5,124,805 | A | * | 6/1992 | Chung et al. ................. 348/838 |
| 5,250,888 | A | * | 10/1993 | Yu .............................. 318/640 |
| 5,604,551 | A | * | 2/1997 | Choi et al. .................... 396/58 |
| 5,663,622 | A | * | 9/1997 | Sekiguchi .................... 318/563 |
| 5,749,304 | A | * | 5/1998 | Turner ......................... 108/20 |
| 6,231,020 | B1 | * | 5/2001 | Willson .................... 248/349.1 |
| 6,311,141 | B1 | * | 10/2001 | Hazra ......................... 702/150 |
| 6,334,599 | B1 | * | 1/2002 | Jeong ......................... 248/371 |
| 6,354,550 | B2 | * | 3/2002 | Jeong ...................... 248/299.1 |
| 6,931,596 | B2 | * | 8/2005 | Gutta et al. .................. 715/728 |
| 7,002,548 | B2 | * | 2/2006 | Yamaguchi et al. ......... 345/110 |
| 7,023,499 | B2 | * | 4/2006 | Williams et al. ............. 348/836 |
| 2001/0011696 | A1 | * | 8/2001 | Jeong .......................... 248/415 |
| 2002/0149613 | A1 | * | 10/2002 | Gutta et al. .................. 345/728 |
| 2003/0058372 | A1 | * | 3/2003 | Williams et al. ............. 348/836 |
| 2005/0035246 | A1 | * | 2/2005 | Coleman ..................... 248/131 |
| 2005/0161067 | A1 | * | 7/2005 | Hollins ......................... 135/16 |
| 2005/0166409 | A1 | * | 8/2005 | Chou et al. .................... 33/290 |
| 2005/0194509 | A1 | * | 9/2005 | Tsai et al. ................ 248/349.1 |

(Continued)

FOREIGN PATENT DOCUMENTS

GB    2 252 003    7/1992

(Continued)

*Primary Examiner*—Paul Ip
(74) *Attorney, Agent, or Firm*—Antonelli, Terry, Stout & Kraus, LLP.

(57) ABSTRACT

A self-supporting stand for a thin display device is to be controlled so that the display device faces in a preset screen direction in a one-touch manner. A function of constantly recognizing the screen direction of the display device and detecting its own direction by detecting a resistance value of a resistance volume such as a variable resistor installed in an electric screen direction changing mechanism, and a control unit which reproduces a preset screen direction no matter in which direction the screen faces currently, are combined with each other.

8 Claims, 12 Drawing Sheets

U.S. PATENT DOCUMENTS

2006/0063595 A1* 3/2006 Kondo .................... 463/46
2007/0144410 A1* 6/2007 Todorovic ................ 108/94
2007/0185587 A1* 8/2007 Kondo .................... 700/19
2007/0252854 A1* 11/2007 Ueno ..................... 345/649
2007/0258200 A1* 11/2007 Choi et al. ............... 361/681

FOREIGN PATENT DOCUMENTS

JP          2001-285755          10/2001

* cited by examiner

IMAGE DISPLAY DEVICE AND STAND FOR IMAGE DISPLAY DEVICE

CLAIM OF PRIORITY

The present application claims priority from Japanese application serial no. JP 2005-178713, filed on Jun. 20, 2005, the content of which is hereby incorporated by reference into this application.

BACKGROUND OF THE INVENTION

The present invention relates to an image display device and a stand for the image display device able to rotate a body of the image display device to change the direction of the screen.

A known image display device is equipped with a stand for rotatably holding a body of the image display device so that the direction of the screen can be set freely. According to this image display device, by rotating the body of the image display device so that the screen is positioned in front of a user who watches the screen, it is possible to enhance the degree of freedom with respect to the position of the user and installation of the image display device. An image display device has recently been becoming more and more popular wherein the rotational movement of the body of the image display device is controlled remotely using a remote controller.

The technique of remotely controlling the rotational movement of the image display device body with a remote controller is disclosed, for example, in Patent Literature 1 (Japanese Patent Laid-Open No. 2001-285755).

SUMMARY OF THE INVENTION

According to the technique disclosed in Patent Literature 1, the direction of a remote control is detected and the image display device body is moved rotationally so that the screen faces in the detected direction. However, there is the problem that the user must continue pushing a button of the remote controller until the direction of the remote control is detected. Further, in the case where a large number of users watch the screen, a certain position of a person who has operated the remote controller does not correspond to an optimum direction of the screen because the screen faces in the remote controller-operated direction.

The present invention has bee accomplished for solving the above-mentioned problems and it is an object of the invention to provide an image display device convenient for use and able to direct the screen in a direction desired by a user.

The image display device of the present invention is provided with a rotating mechanism which rotates the direction of a screen of the image display device and a detector which detects the angle of rotation made by the rotating mechanism. According to this construction, the direction of the screen of the image display device can be rotated quickly to a desired angle.

Thus, the image display device is convenient for use and can direct the screen in a direction desired by a user.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF PREFERRED EMBODIMENTS

Figure 1:
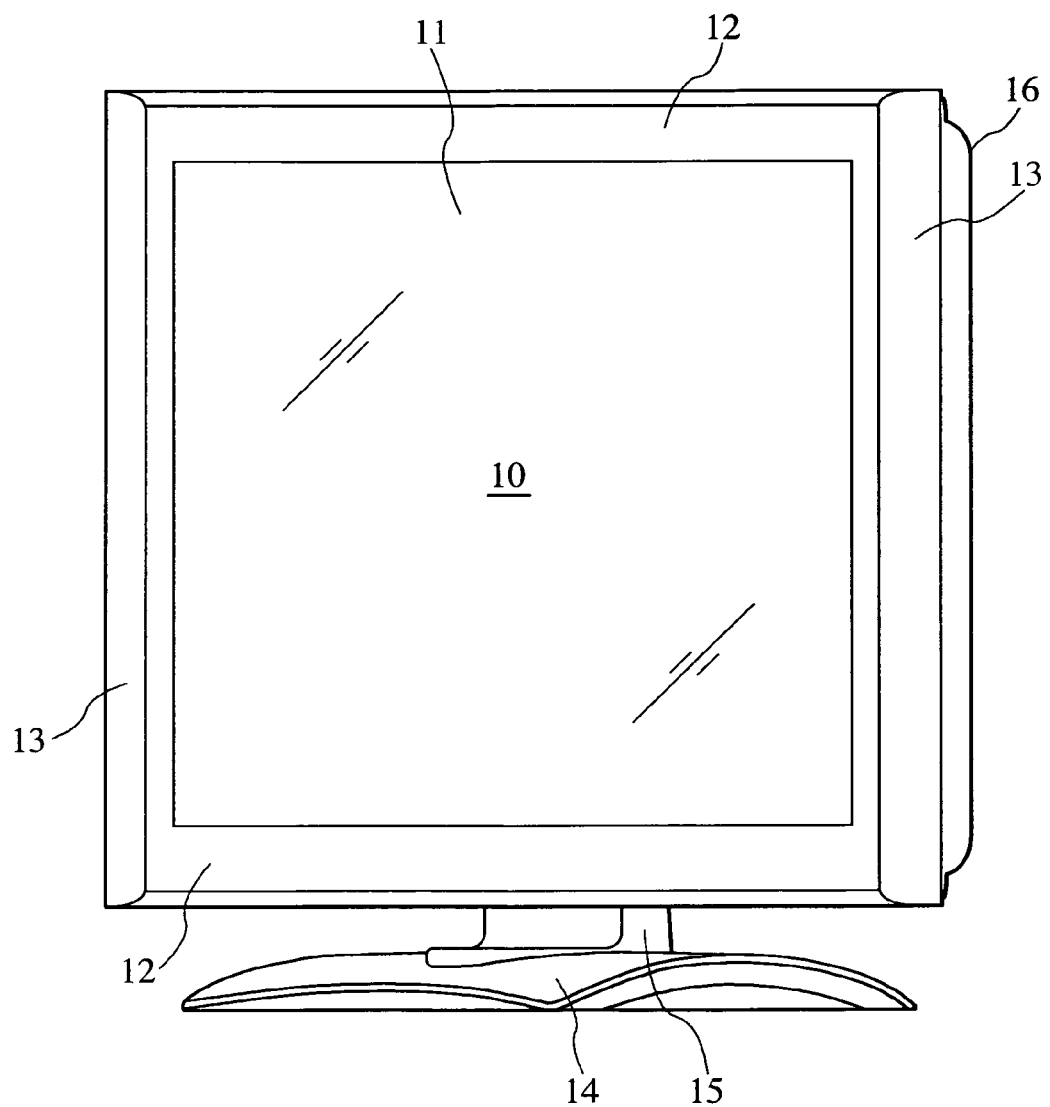
FIG. 1 is a perspective view showing an appearance of an image display device according to a first embodiment of the present invention.

With reference to the accompanying drawings, the present invention will be described hereinunder by way of a plasma display panel as an example which is one of image display devices. In all the drawings, components having common functions are identified by the same reference numerals, and, repeated explanations of components once described will be omitted to avoid complexity.

First Embodiment

In an image display device according to a first embodiment of the present invention, a resistance volume of for example a variable resistor is installed within a screen direction changing mechanism, and by detecting a resistance value of the variable resistor, the direction of the screen of the display device is recognized constantly.

First, a description will be given about the construction of the image display device.

FIG. 1 is a perspective view showing an appearance of the image display device embodying the present invention. The reference numeral 10 denotes a body of the image display device, numeral 14 denotes a stand, and numeral 15 denotes a body holding portion. The image display device body 10 is held by the stand 14 through the body holding portion 15. The image display device body 10 includes an image display portion 11, a frame 12, a speaker 13, and a back cover 16. Electric circuits such as a power supply circuit and an image control circuit (not shown) are disposed in the interior of the image display device body 10.

Figure 2:
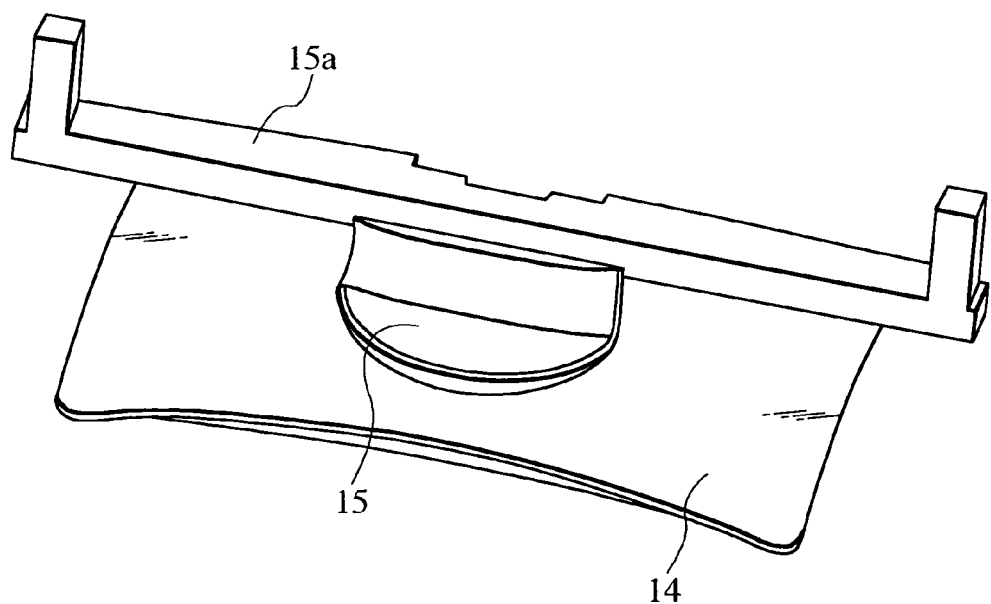
FIG. 2 is a perspective view of a stand portion in a state in which a body of the image display device is removed from the image display device.

FIG. 2 is a perspective view of the stand portion in a state in which the image display device body 10 is removed from the image display device. The image display device body 10 is fixed to and held by an arm 15a of the body holding portion 15. The body holding portion 15 is held rotatably with respect to the stand 14. As the body holding portion 15 rotates, the image display device body 10 rotates as well.

Figure 3:
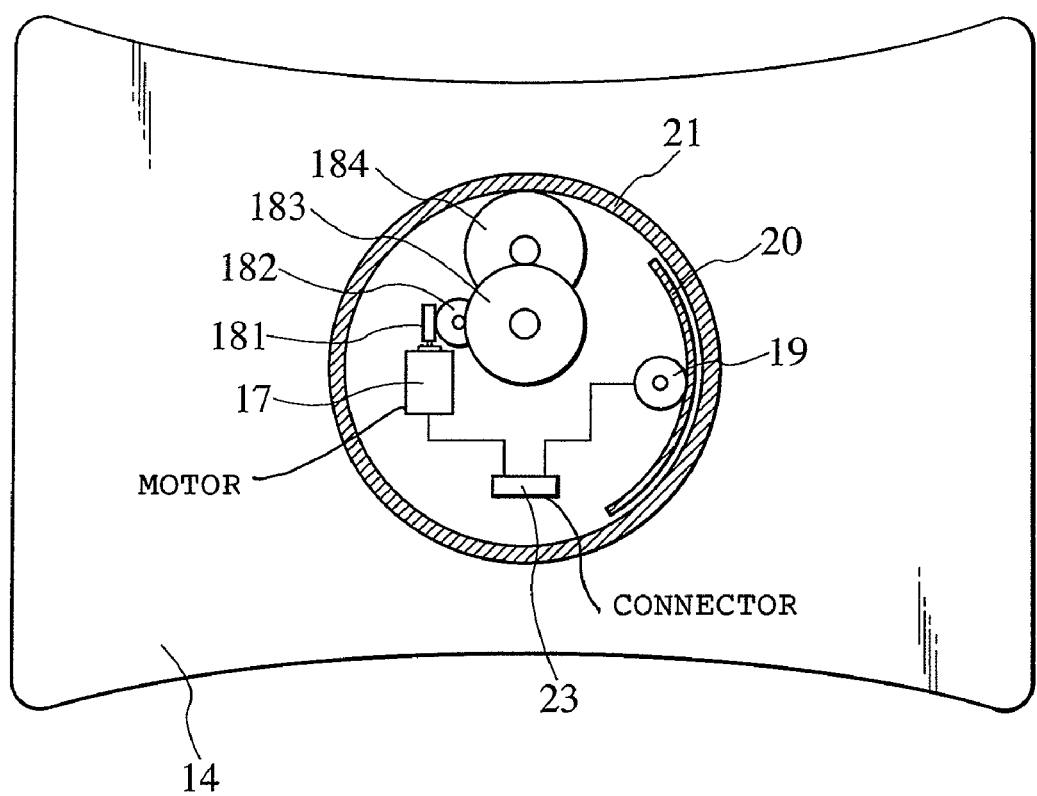
FIG. 3 is a diagram showing an internal structure of the stand portion.

Next, a description will be given about a rotating mechanism. FIG. 3 illustrates an internal structure of the stand 14. The numeral 17 denotes a motor, which is connected to an angle detecting gear 21 via gear trains 181, 182, 183, and 184. The angle detecting gear 21 is fixed to the body holding portion 15. When the motor 17 is rotated, its rotational force causes the angle detecting gear 21 to rotate via gear trains 181, 182, 183, and 184. The body holding portion 15 is adapted to rotate with rotation of the angle detecting gear 21. Numeral 19 denotes a potentiometer and numeral 20 denotes a movable gear. A gear is provided in a sensor portion of the potentiometer 19 and a gear is also provided on an inner surface of the movable gear 20, both gears being in mesh with each other. The movable gear 20 is fixed to the body holding portion 15 and is adapted to rotate with rotation of the body holding portion 15, causing the sensor portion of the potentiometer 19 to rotate. The potentiometer 19 is provided in the interior thereof with a variable resistor to convert a rotational angle of the sensor portion into an electric signal. The rotational angle of the body holding portion 15 can be detected by monitoring the output of the potentiometer 19 and hence it is possible to detect in which direction the image display portion 11 of the image display device body 10 faces. Numeral 23 denotes a connector, which is connected to both motor 17 and potentiometer 19 by wiring.

Figure 4:
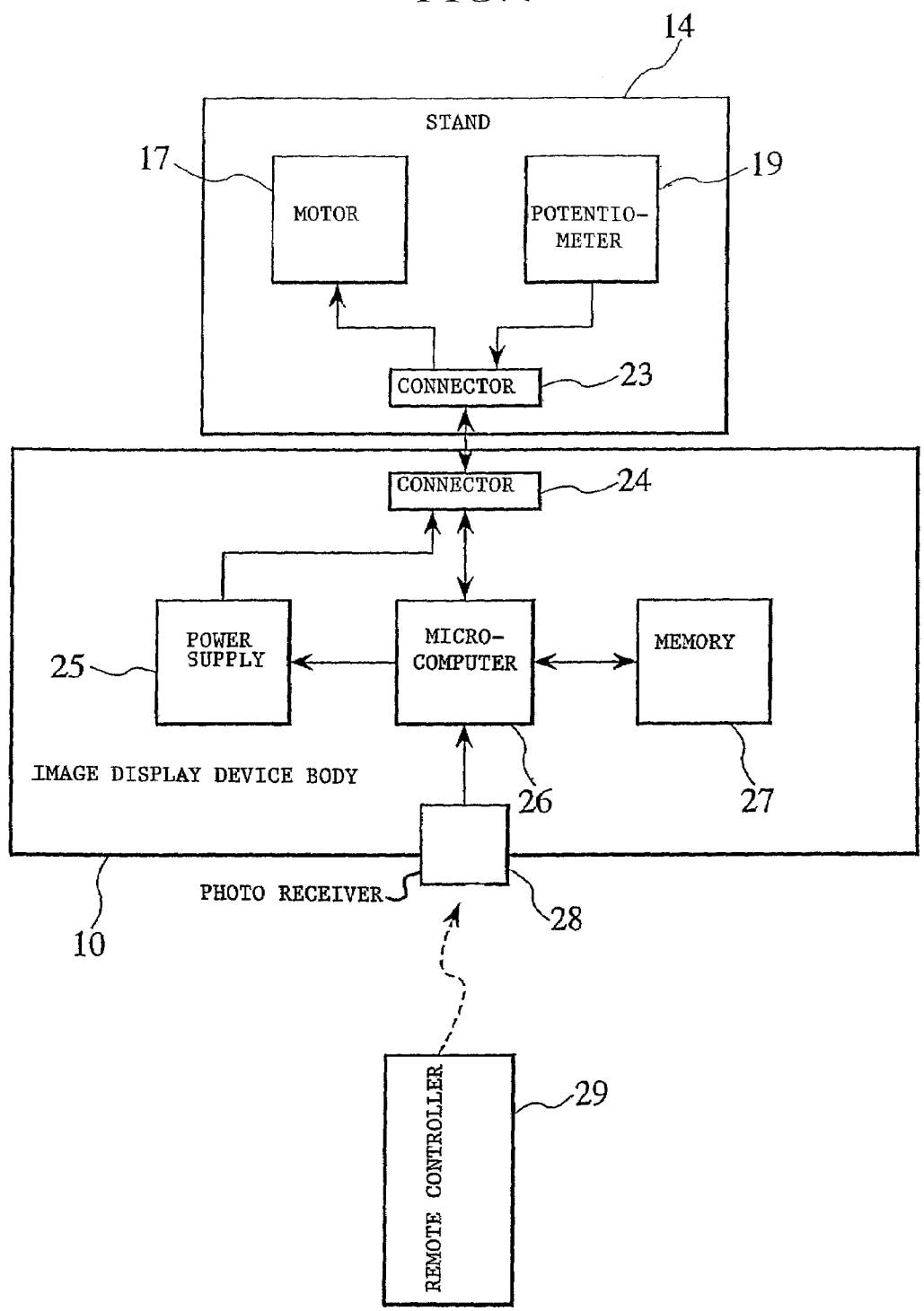
FIG. 4 is a block diagram of the image display device.

FIG. 4 is a block diagram of part of the image display device embodying the present invention. As described earlier, numerals 14, 17, 19, and 23, denote a stand, a motor, a potentiometer, and a connector, respectively. The image display device body 10 includes a connector 24, a power supply 25 for the motor, a microcomputer 26, a memory 27, and a remote controller photoreceiver 28. Numeral 29 denotes a remote controller. In addition to these components, electric circuits such as a control circuit and a power supply circuit are installed in the image display device body 10, but their illustrations are omitted to simplify the explanation. The image display device body 10 and the stand 14 are electrically connected together by the connectors 23 and 24.

A brief description will now be given about the operation. When a button of the remote controller 29 is pushed, a control signal is transmitted from the remote controller photoreceiver 28 to the microcomputer 26. The microcomputer 26 transmits electric power from the motor power supply 25 to the motor 17 via the connectors 23 and 24, causing the image display device body 10 to rotate. At this time, the microcomputer 26 reads via the connectors 23 and 24 a screen position signal provided from the potentiometer 19 and detects the angle (screen position) of the image display device body 10. Usually, a limitation is placed such that the rotational range of the image display device body 10 is up to 20° to the right and left. This is because if the rotational range is set large, the image display device body may collide with a wall or the like located near the installed place of the image display device.

Figure 5:
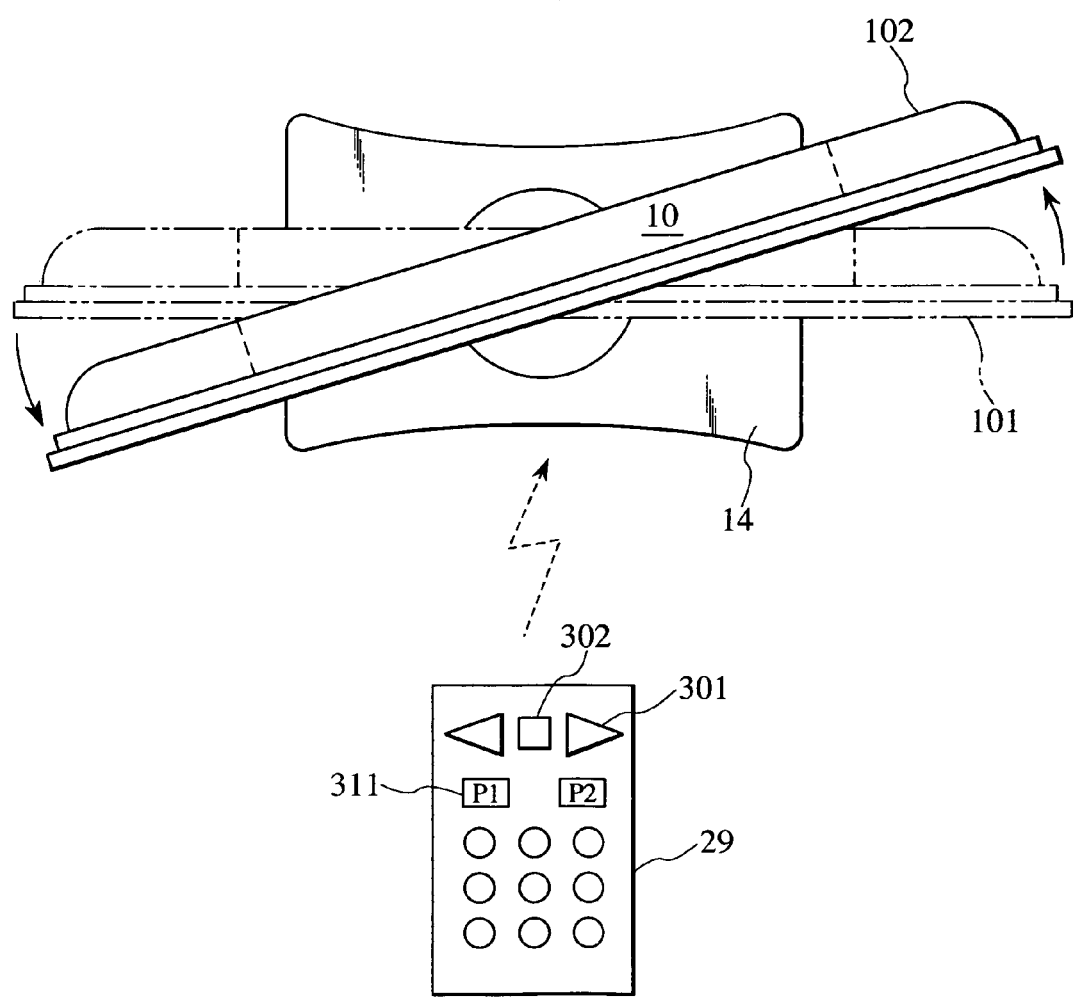
FIG. 5 is a diagram explanatory of a method for setting a memory position 1.

Next, a description will be given about a method for setting a first position (memory position 1) of the image display device body 10. FIG. 5 is a diagram explanatory of a method for setting the memory position 1. Numeral 29 denotes a remote controller, numeral 301 denotes a right rotation button, numeral 302 denotes a position memory button, and numeral 311 denotes a memory position 1 button. Numeral 101 indicates the present position of the image display device body 10 and numeral 102 indicates a desired screen direction of the image display device body 10.

Figure 6:
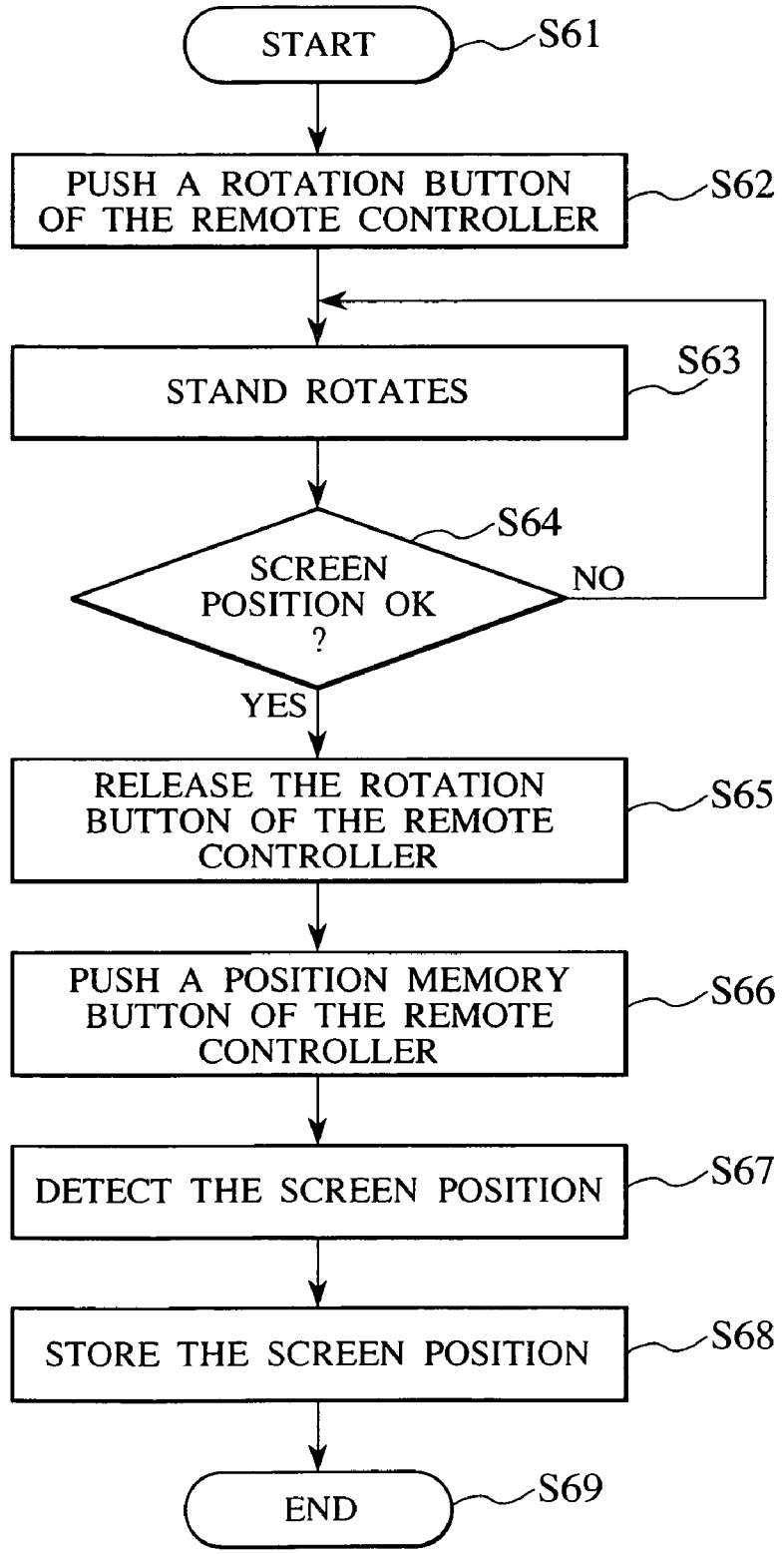
FIG. 6 is a flow chart of a method for storing and setting a screen position.

FIG. 6 is a flow chart of a method for storing and setting a screen position. With reference to FIGS. 5 and 6, a description will be given below about a method for setting the screen memory position 1.

First (S61), the right rotation button 301 of the remote controller 29 is pushed (S62). The resulting signal is received by the remote controller photoreceiver 28, which in turn transmits the signal to the microcomputer 26. The microcomputer 26 supplies electric power from the motor power supply 25 to the motor 17 installed within the stand 14, causing the motor 17 to rotate and thereby causing the gear trains 181, 182, 183, and 184 to rotate, whereby the angle detecting gear 21 rotates. As a result, the image display device body 10 rotates in the direction of arrow (S63). The right rotation button 301 is kept pushed until the image display device body 101 arrives at the position 101 (S64→S63 is repeated). Upon arrival of the image display device body at the position 101 (S64→S65), the right rotation button 301 is released (S65), whereby the supply of electric power from the motor power supply 25 to the motor 17 stops and the image display device body 10 stops at the position 102. In this state, the position memory button 302 of the remote controller 29 is pushed and subsequently the memory position 1 button 311 is pushed (S66), whereby the microcomputer 26 reads a screen position signal from the potentiometer 19 (S67), stores the screen position as the memory position 1 in the memory 27 (S68) and ends the screen position storing and setting process (S69).

Figure 7:
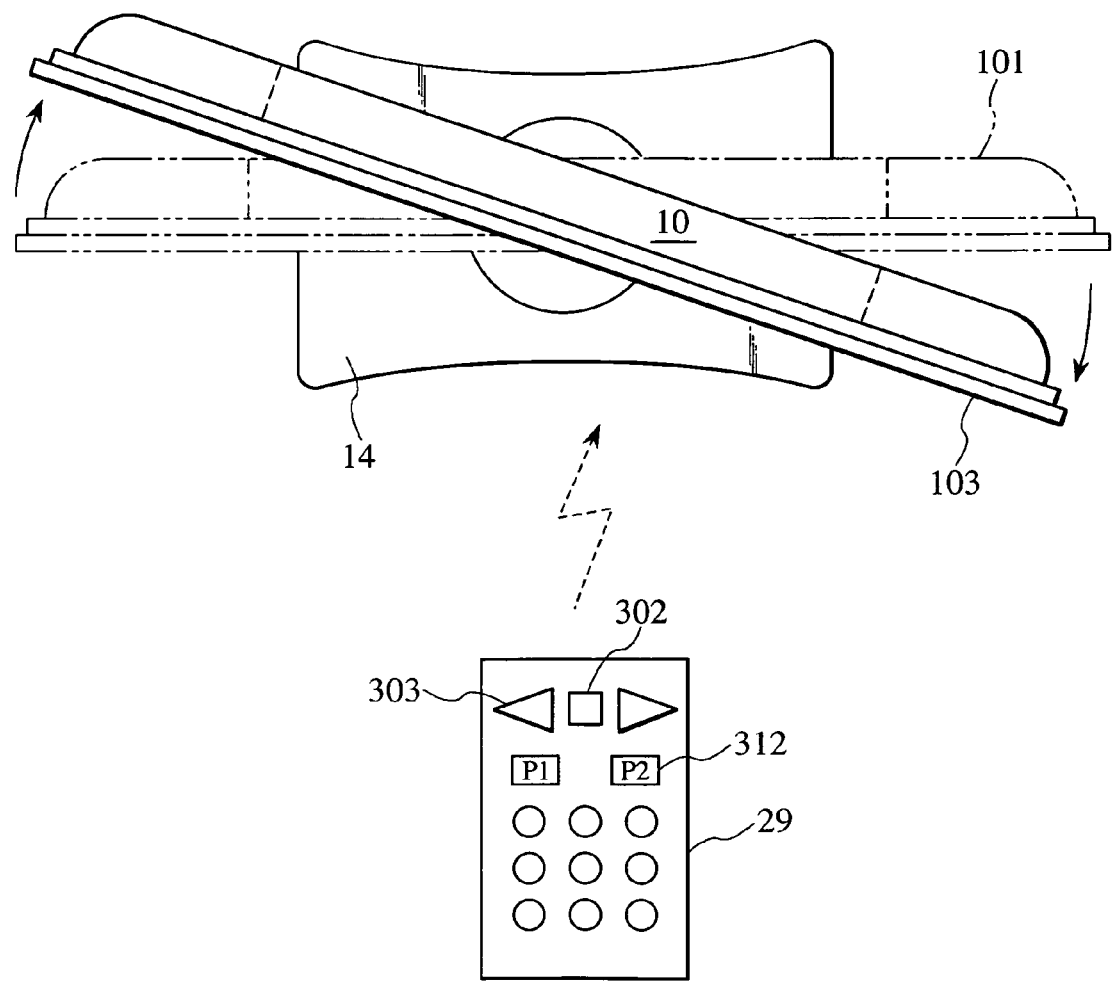
FIG. 7 is a diagram explanatory of a method for setting a memory position 2.

Next, a description will be given about a method for setting a second position (memory position 2) of the image display device body 10. FIG. 7 is a diagram explanatory of a method for setting the memory position 2. Numeral 303 denotes a left rotation button and numeral 312 denotes a memory position 2 button. Numeral 101 indicates the present position of the image display device body 10 and numeral 103 indicates a desired screen direction of the image display device body 10.

As in the above method for setting the memory position 1, when the left rotation button 303 of the remote controller 29 is pushed, the image display device body 10 rotates in the direction of arrow, and the left rotation button 303 is released upon arrival of the image display device body 10 at the position of 103. Then, by pushing the position memory button 302 and subsequently pushing the memory position 2 button 312, the position of 103 is stored as a memory position 2 in the memory 27.

In the image display device embodying the present invention, as described above, the user sets the position of the image display device body 10 to a desired position by pushing the right rotation button 301 and the left rotation button 303 of the remote controller 29, and thereafter the set position is stored. Thus, the position can be set freely within the rotational range of the image display device body 10.

Figure 8:
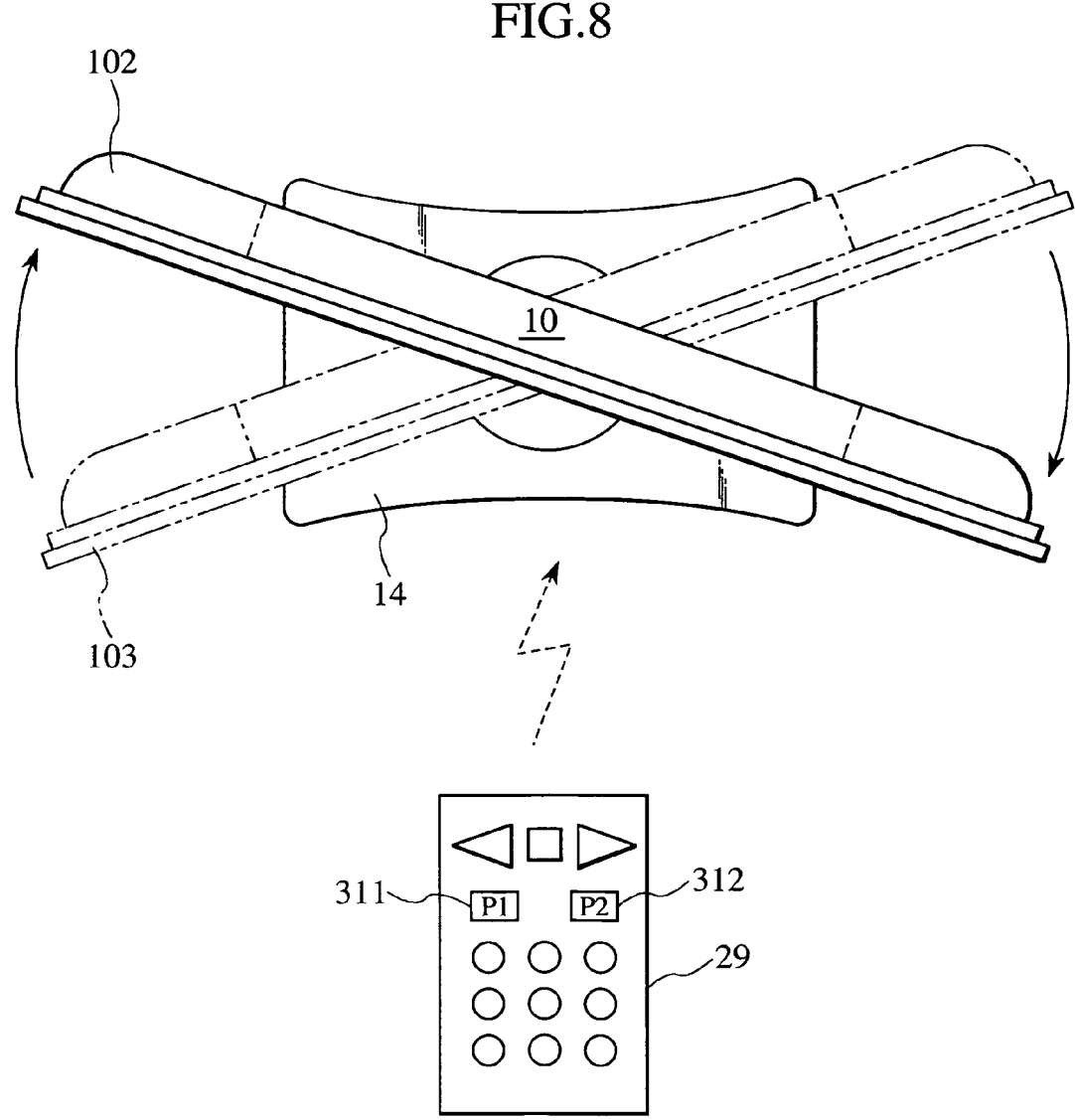
FIG. 8 is a diagram explanatory of operation for rotating the position of the body of the image display device up to the memory position 1.
Figure 9:
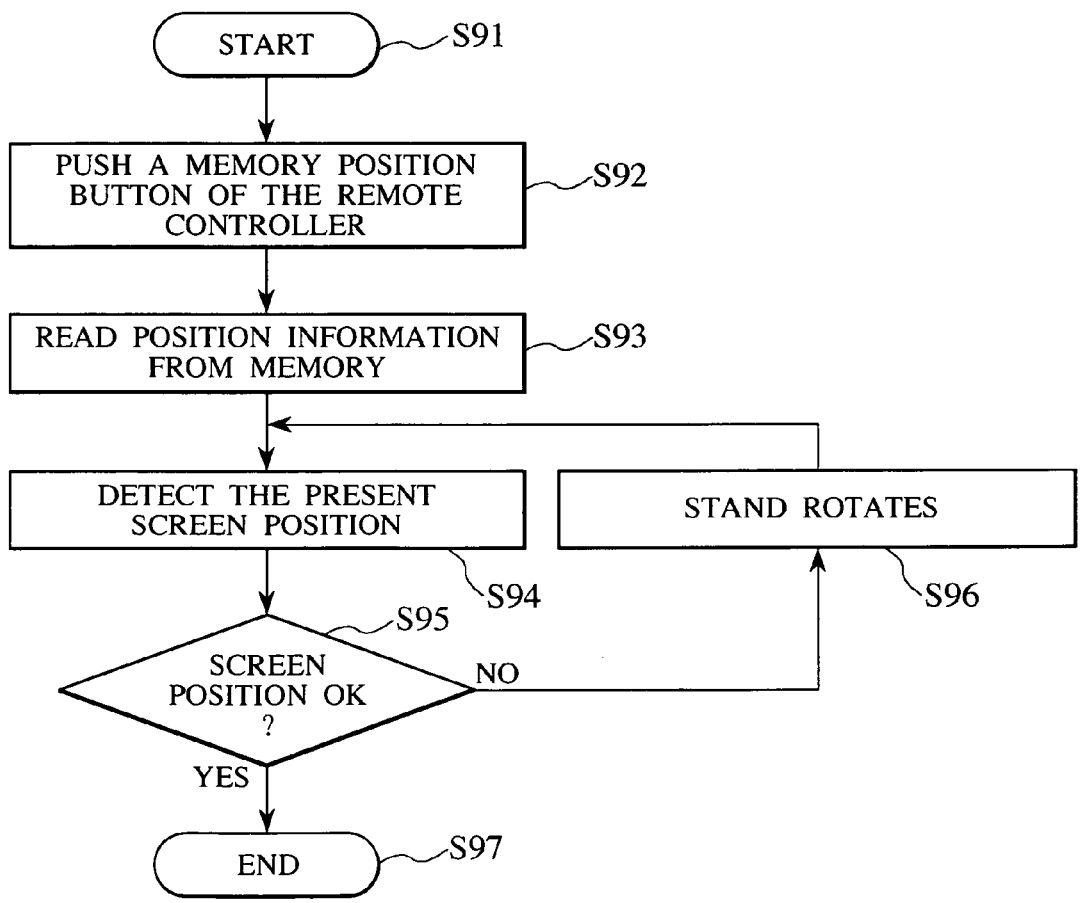
FIG. 9 is a flow chart of operation for rotating the position of the body of the image display device up to the memory position 1.

A description will now be given about a method for making the position of the image display device body 10 coincident with the memory position 1. FIG. 8 is a diagram explanatory of operation for rotating the position of the image display device body 10 up to the memory position 1. Numeral 103 indicates the present position (memory position 2) of the image display device body 10 and numeral 102 indicates the memory position 2. FIG. 9 is a flow chart of operation for rotating the position of the image display device body 10 up to the memory position 1.

First (S91), the memory position 1 of the remote controller 29 is pushed (S92). A control signal provided from the remote controller 29 is received by the remote controller photoreceiver 28, which in turn transmits the signal to the microcomputer 26. The microcomputer 26 reads position information for the memory position 1 from the memory 27 (S93). Next, the microcomputer 26 reads position information from the potentiometer 19 in order to detect the present direction in which the image display device body 10 faces (S94). Then, the microcomputer 26 makes comparison between the position information read from the memory 27 and corresponding to the memory position 1 and the position information in the present direction in which the image display device body 10 faces (S95). If both are different, electric power is fed to the motor 17 from the motor power supply 25 to rotate the image display device body 10 so that the direction in which the image display device body 10 faces coincides with that of the memory position 1 (S96). These operations are repeated and when the position information provided from the potentiometer 19 becomes coincident with the position information corresponding to the memory position 1, that is, when the position of the image display device body 10 rotates up to the position 102, the supply of electric power to the motor 17 is stopped to end the processing (S97).

Thus, by such a simple operation as merely pushing the buttons 311 and 312 of the remote controller 29, it is possible to change the direction of the screen of the image display device body 10 to a stored position, with the result that the image display device becomes more convenient for use.

Although the number of memory positions in the above first embodiment is two, no limitation is made thereto. There may be three or more such memory positions. Also for the operating buttons of the remote controller 29, each button possesses one function in the above first embodiment, but no limitation is made thereto. A single button may be used in common to two or more functions.

Second Embodiment

The structure and configuration of an image display device according to a second embodiment of the present invention are the same as in the first embodiment and therefore an explanation thereof will here be omitted.

Figure 10:
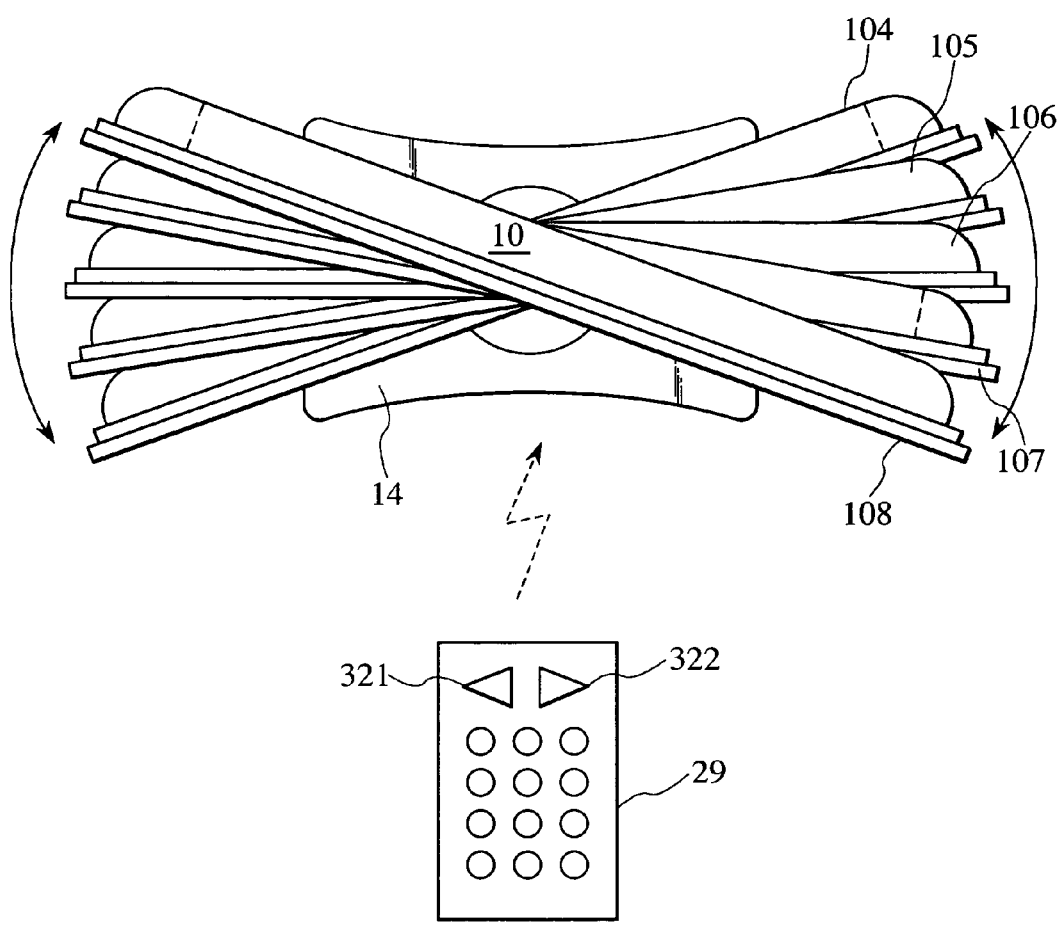
FIG. 10 is a diagram showing operation of an image display device according to a second embodiment of the present invention.

The operation of the image display device of this second embodiment will be described with reference to FIG. 10 which illustrates the same operation. As shown in FIG. 10, the direction of the image display device body 10 can be set in five stages which are a front direction (106), further, with respect to the front direction, rightward 10° rotation (105), rightward 20° rotation (104), leftward 10° rotation (107), and leftward 20° rotation (108). In this case, it is assumed that the positions of 104, 105, 106, 107, and 108, are positions 1, 2, 3, 4, and 5, respectively, and that the rotational range of the image display device body 10 is from leftward 20° to rightward 20°. Position information pieces at the respective positions of the image display device body 10, which are provided from the potentiometer 19, are stored beforehand in the memory 27.

Figure 11:
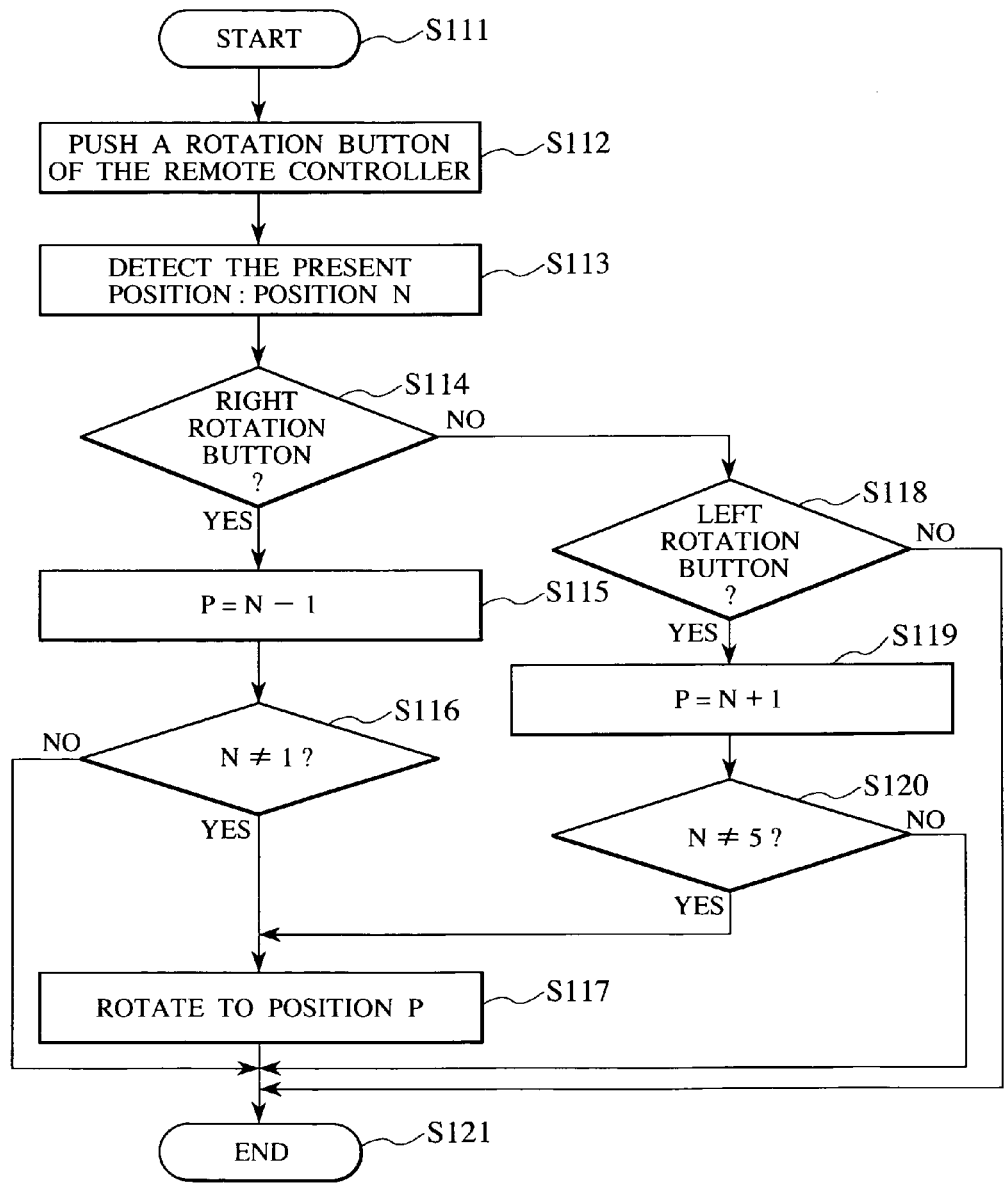
FIG. 11 is a flow chart of operation of the image display device of the second embodiment.

FIG. 11 shows an operation flow of the image display device of the second embodiment. The operation of the image display device performed when pushing the right rotation button 322 of the remote controller 29 will be described below as an example in a state in which the image display device body 10 currently lies at position 2 (105).

First (S111), when the right rotation button 322 of the remote controller 29 is pushed (S112), position information provided from the potentiometer 19 is read and it is detected in which position the image display device body 10 lies at present. In this case, since the image display device body 10 lies at position 2 (105), N=2 (S113). A check is made to see if the button pushed in S114 is the right rotation button 322. Since in this case the button in question is the right rotation button 322, the processing flow advances to S115, in which P=1 (=N−1). In S116, a check is made to see if N≠1. Since N=2, the processing flow advances to S117, in which the image display device body 10 is rotated into position P (=1), followed by ending of the process (S121). That is, when the right rotation button 322 is pushed in the state of position 2 (105), the image display device 10 rotates 10° rightward into position 1 (104). From this state (S111), when the right rotation button 322 is further pushed (S112), as in the above processing, N=1 in S113, and then in S115 from S114, P=0. Since N=0 in S116, the processing flow advances to S121 to end the processing without rotation of the image display device body 10. That is, a control is made lest the position of the image display device body 10 should exceed the rotatable range.

From this state, when the left rotation button 321 of the remote controller 29 is pushed, the processing advances to S114 in the same manner as is the case with the right rotation button 322 being pushed. N=1 is detected in S113, and then the processing flow advances from S114 to S118. Since the pushed button is the left rotation button 321, the processing flow advances from S118 to S119, in which P=2 (=N+1). Then, since N≠5 in S120, the processing flow advances to S117, in which the image display device body 10 is rotated into position P (=2), and then the processing ends (S121). The reason why N≠5 is checked in S120 is that it is intended to prevent the position of the image display device body 10 from exceeding the rotatable range. That is, when the left rotation button 321 is pushed, the image display device body 10 rotates 10° leftward within a range not exceeding the rotatable range.

Thus, by such a simple operation as merely pushing the buttons 321 and 322 of the remote controller 29, it is possible to change the direction of the screen of the image display device body 10, so that the device becomes easier to use as in the first embodiment.

Although in this second embodiment it has been described that the rotational angle in a single operation is 10° and that the rotatable range is from 20° leftward to 20° rightward, no limitation is made thereto. Further, although the number of memory positions is two, no limitation is made thereto, either.

Third Embodiment

In the previous first and second embodiments an angle desired by the user is stored and the screen direction is rotated to the stored angle position in a simple manner using a remote controller. However, it is presumed that the setting of angle on the user side is performed in increments of about 10° as in the second embodiment for example. In such a case, it may be necessary to finely adjust the screen angle after rotation.

In this third embodiment, therefore, a description will be given below about the mode of finely adjusting the screen angle after rotation with use of a simple method.

Figure 12:
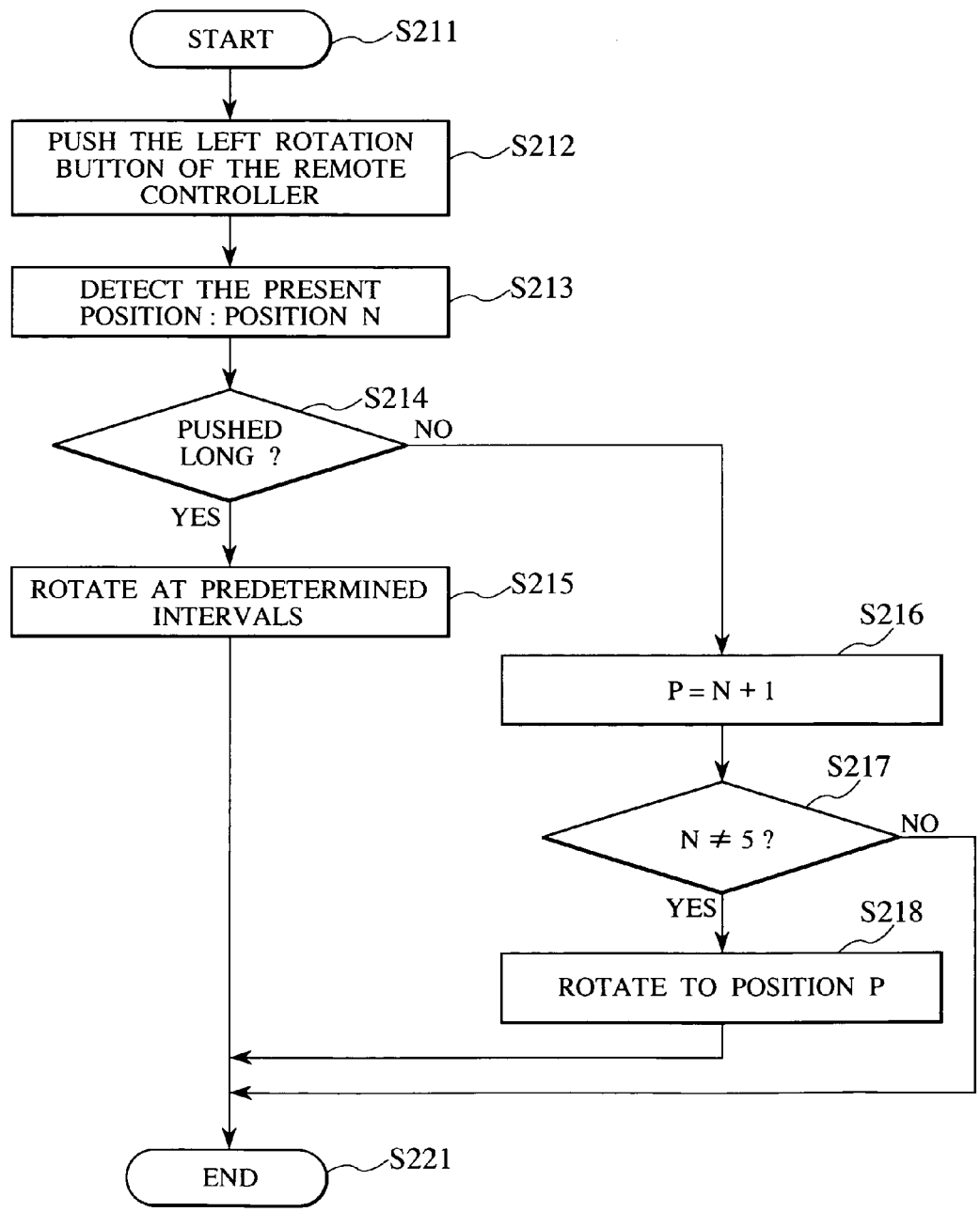
FIG. 12 is a flow chart of operation of an image display device according to a third embodiment of the present invention.

FIG. 12 shows an operation flow of an image display device according to this third embodiment.

Reference will be made below to an example of operation performed when the left rotation button 321 of the remote controller 29 is pushed long in a state in which the image display device body 10 currently lies at position 2 (105). By pushing the remote controller button long as referred to herein is meant to push the button three seconds or longer for example.

First (S211), when the left rotation button 321 of the remote controller 29 is pushed (S212), position information provided from the potentiometer 19 is read and it is detected at which position the image display device body 10 lies at present. In this case, N is equal to 2 (N=2) because the image display device body 10 lies at position 2 (105) (S213). A check is made to see if the button was pushed long in S214. Since the answer is affirmative in this case, the processing flow advances to S215, in which the angle is adjusted at predetermined angular intervals of, say, 1° and the processing ends (S221). The processing to be performed when the button is not pushed long is the same as in the second embodiment and therefore an explanation thereof is here omitted. Also for the right rotation button 322, the screen angle can be adjusted by the same operation.

Thus, fine adjustment is made by pushing the remote controller button long, while rotation to a memory position is performed by pushing the button short. With such a simple operation, the screen direction of the image display device body 10 can be rotated to a desired direction and thus the image display device becomes easier to use.

Although in the above third embodiment movement to a stored angle and fine adjustment of the angle are switched from one to the other by changing the operation time of the same button, no limitation is made thereto. A button for fine adjustment and a button for movement to a stored angle may be provided.

Although the present invention relates to an image display device, the invention may also be applied to audio devices such as speakers and general electric devices.

While we have shown and described several embodiments in accordance with our invention, it should be understood that disclosed embodiments are susceptible to changes and modifications without departing from the scope of the invention. Therefore, we do not intend to be bound by the details shown and described herein but intend to cover all such changes and modifications as fall within the ambit of the appended claims.

What is claimed is:

1. An image display device comprising:
   a body of the image display device;
   a rotating mechanism which supports said body and rotates said body to change a rotational position of an image display portion of said body;
   a detector which detects the rotational position of said body rotated by said rotating mechanism and generates rotational position information;
   a control unit which controls said rotating mechanism and includes a memory;
   wherein said control unit controls said rotating mechanism to rotate said body for a first rotational operation and a second rotational operation, said memory storing rotational position information of said body detected by said detector; and
   wherein said control unit controls said rotating mechanism to rotate said body to a desired rotational position for the first rotational operation and said control unit controls said rotating mechanism to rotate said body to the rotational position corresponding to the rotational position information stored in said memory for the second rotational operation.

2. An image display device according to claim 1, wherein for the second rotational operation, said control unit compares the rotational position information detected by said detector with the rotational position information stored in said memory and controls said rotating mechanism so that the rotational position information detected by said detector corresponds to the rotational position information stored in said memory.

3. An image display device according to claim 1, wherein for the second rotational operation, said control unit controls said rotating mechanism so as to rotate said body to a predetermined rotational position.

4. An image display device according to claim 1, wherein said detector is a potentiometer.

5. An image display device according to claim 1, wherein said control unit includes a remote controller for enabling the first and second rotational positional operations.

6. An image display device according to claim 1, wherein said body includes an image display unit, said image display unit being a liquid crystal panel display or a plasma display panel, and a rotational angle of said image display unit being limited to an angle falling under a predetermined angular range.

7. A stand for holding a body of an image display device, comprising:
   a rotating mechanism which rotates said body to change the rotational position of the image display portion of said body;
   a detector which detects the rotational position of said body rotated by said rotating mechanism and generates rotational position information;
   a control unit which controls said rotating mechanism and includes a memory;
   wherein said control unit controls said rotating mechanism to rotate said body for a first rotational operation and a second rotational operation, said memory storing rotational position information of said body detected by said detector; and
   wherein said control unit controls said rotating mechanism to rotate said body to a desired rotational position for the first rotational operation and said control unit controls said rotating mechanism to rotate said body to the rotational position corresponding to the rotational position information stored in said memory for the second rotational operation.

8. A stand according to claim 7, wherein said detector is a potentiometer.

* * * * *